United States Patent [19]

Brand, Jr.

[11] 3,763,355

[45] Oct. 2, 1973

[54] DYNAMIC POSITION-ACTUATED CARD READER

[75] Inventor: Jake L. Brand, Jr., Dallas, Tex.

[73] Assignee: Texas Instruments Incorporated, Dallas, Tex.

[22] Filed: Dec. 29, 1971

[21] Appl. No.: 213,600

[52] U.S. Cl. .......... 235/61.11 E

[51] Int. Cl. .......... G06r 7/00

[58] Field of Search .......... 235/61.11 E, 61.11 R, 235/61.6 R; 340/146.3 Z, 146.3 MA; 200/46

[56] References Cited

UNITED STATES PATENTS

| | | | |
|---|---|---|---|
| 3,440,409 | 4/1969 | Kaminsky et al. | 235/61.11 E |
| 3,655,948 | 4/1972 | Spauszus | 235/61.11 E |
| 3,480,762 | 11/1969 | DelVecchio | 235/61.11 E |
| 3,229,073 | 1/1966 | Macker et al. | 235/61.11 E |
| 3,474,232 | 10/1969 | Hearn et al. | 235/61.11 E |
| 3,463,906 | 8/1969 | Chiang | 235/61.11 E |

*Primary Examiner*—Thomas A. Robinson
*Attorney*—Harold Levine et al.

[57] ABSTRACT

A card reader includes a first plurality of sensors positioned in a row for sensing the position of a card moved dynamically across such sensors and a second plurality of sensors positioned in a row substantially perpendicular to the row of position sensors for reading information from a card. In one embodiment, the card contains Hollerith information. The card reader reads all of the digits or characters contained on the card simultaneously one-code-line at a time as the card is dynamically moved across the second row of sensors. Additional sensors are provided to determine whether the card is upside down, whether the card is an invalid card and to indicate when the card is initially positioned so that the card reader can start reading. The dynamic position-activated card reader system can be used in reading punched cards, credit cards, security badges and the like.

31 Claims, 8 Drawing Figures

DYNAMIC POSITION-ACTUATED CARD READER

This invention relates to card reader systems and more particularly to a dynamic position-actuated card reader system.

It is an object of the present invention to provide an improved card reader system for reading data cards, credit cards, security badges and the like.

It is another object of the invention to provide a card reader system which is activated to read lines of information recorded on a card as the card is dynamically moved through the card reader.

It is a feature of the invention that the particular lines of code which are read by the card reader are selectively activated by the dynamic movement of the card through the card reader.

These and other objects and features are accomplished in accordance with the present invention by providing a card reader which includes a first plurality of sensors positioned in a row for sensing the position of a card moved dynamically across such sensors and a second plurality of sensors positioned in a row preferably substantially perpendicular to the row of position sensors for reading information from the card. In the preferred embodiment, the card reader reads all of the digits or characters contained on the card simultaneously one-code-line at a time by the second row of sensors as the card is dynamically moved through the card reader. As the card is dynamically moved across the sensors in the first row, a counter keeps track of the code-line being read by the second row of sensors as a function of the position of the card in relation to the first row of sensors. Only one sensor in the first row is enabled at a time by a plurality of logic gates in conjunction with the counter so that only one corresponding line of code is read as the card moves across the enabled sensor. If the card is moved backwards across a sensor which has already been enabled, no information is read from the card; it is only when the card is dynamically moved across the enabled sensor that a line of information is read, and then immediately thereafter, the counter and logic gates enable the next sensor in the first row in order for the next code-line to be read by the sensors in the second row as the card is moved across such next sensor. Additional sensors may be provided to determine whether the card is upside down, whether the card is an invalid card, and to indicate when the card is initially positioned so that the card reader can start operating by incrementing the counter and enabling the first sensor in the first row of sensors. Storage means, such as a random access memory, may be provided to store the information as it is read from the cards, the addressing of the memory being provided by the counter.

Still further objects, features and advantages of the invention are apparent from the detailed description and claims and from the accompanying drawings wherein:

Figure 1:
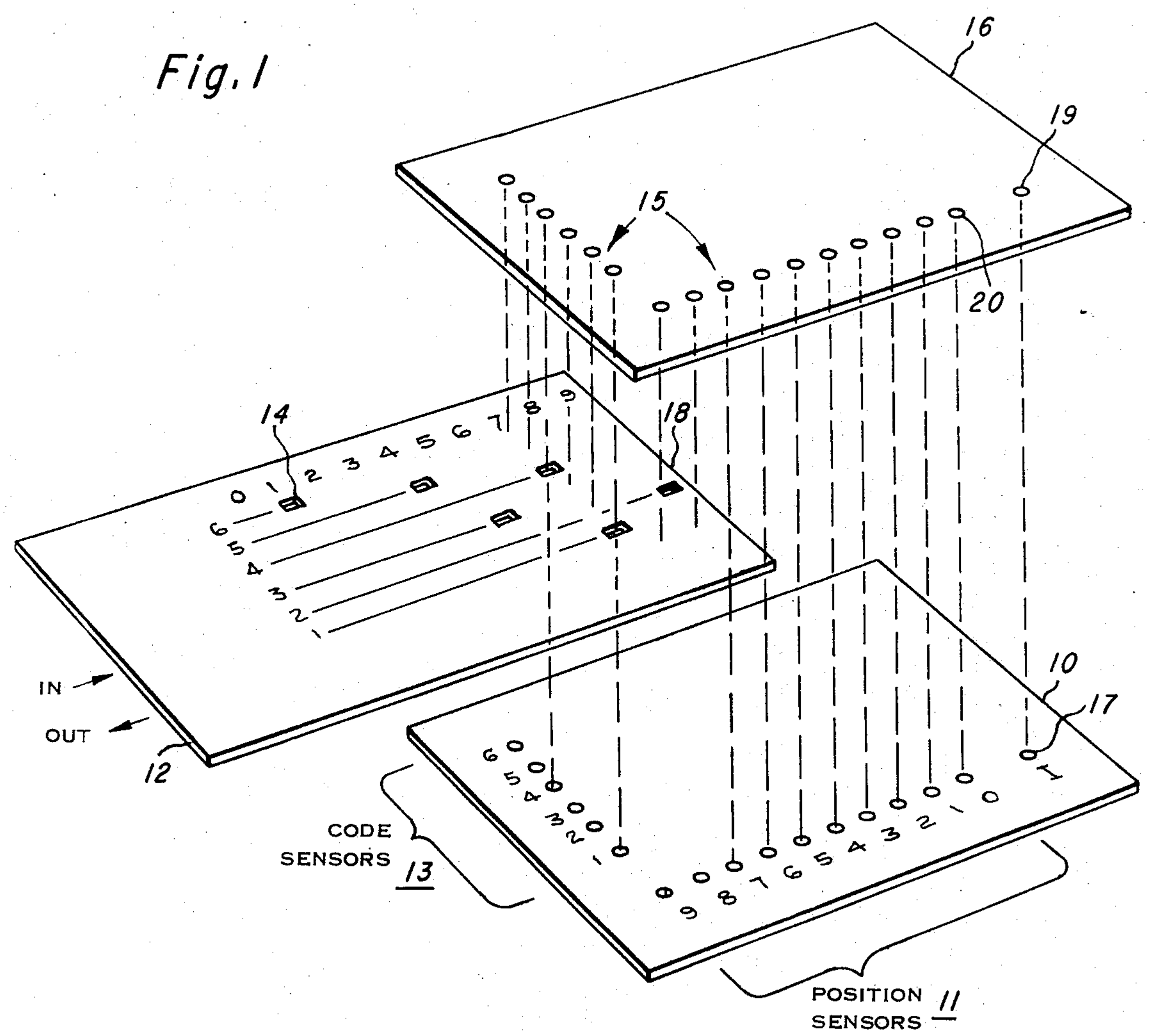
FIG. 1 is an isometric view of a coded card as it is dynamically drawn across the card reader sensors of a card reader system according to an embodiment of the invention.

Referring to the drawings, a card reader of an embodiment of the card reader system of the present invention is illustrated in FIG. 1. The card reader is comprised of a substrate 10 having a first plurality of position sensors 11 aligned in a row for sensing the position of a card 12 moved dynamically across sensors 11 and having a second plurality of sensors 13 positioned in a row preferably perpendicular to the row of position sensors 11 for reading information recorded on card 12.

In the illustrated embodiment, information is recorded on card 12 in the form of punched holes 14 selectively positioned on card 12. Accordingly, the sensors 11 and 13 are shown in the present embodiment as photo-detectors which are responsive to corresponding respective light emitters 15 positioned in a corresponding pattern on substrate 16.

Card 12 is read as follows. Initially, only the I sensor 17 is enabled. As card 12 is inserted into the card reader between substrates 10 and 16 in the IN direction, edge 18 of card 12 passes over sensor 17 and blocks the light generated by a corresponding light emitter 19 from sensor 17 thereby deactivating sensor 17. This activates a counter in combination with a plurality of logic gates to enable the numbered zero position sensor. As the card is withdrawn from the card reader in the OUT direction, the zero position sensor remains dark until edge 18 of card 12 passes over the zero position sensor allowing the light generated by a corresponding light emitter 20 to activate the zero position sensor. When the zero position sensor has been activated, the zero line of code is read from card 12 by sensors 13.

In the illustrated embodiment, card 12 is shown to contain 6 digits of recorded information in 6 rows 1–6 represented by a hole along one of 10 code-lines 0–9, which is typically referred to as a six digit Hollerith code. In the illustrated embodiment all 6 digits are read simultaneously one code-line at a time.

As shown in FIG. 1, card 12 is in a position such that edge 18 of card 12 has passed over the numbered 7 position sensor and code-line 7 is being read by sensors 13. There are 2 holes in code-line 7 in the first and fourth rows which is indicative of the numeral 7 in the first and fourth digit positions of a 6 digit number, for example.

As only the numbered 7 position sensor is enabled when code-line 7 is to be read, reinserting the card into the card reader in the IN direction does not affect the reading sequence. This is the result of the counter which is counting in sequence as each code-line is read and enables only the position sensor for the next line of code to be read when the previous line of code has been read and stored.

Figure 2:
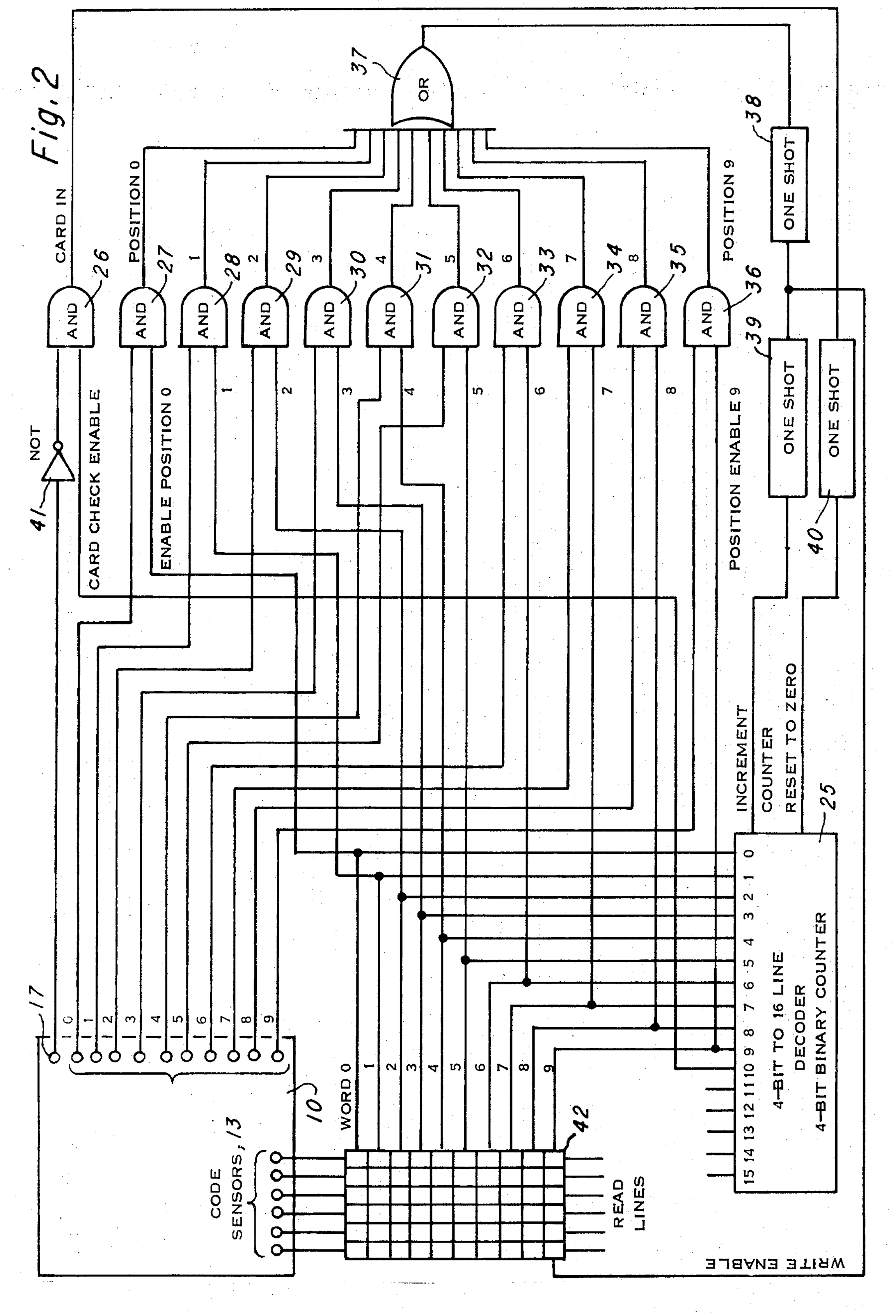
FIG. 2 is a logic diagram of an embodiment of the card reader system of the present invention.

The operation of a card reader system in accordance with the present invention is best understood with reference to FIG. 2. In order for the system illustrated in FIG. 2 to be initialized, counter 25 is set to a count of 10. This may be accomplished employing a settable counter by setting the counter to the number corresponding to the 10 count. Or, whether or not the counter is settable, the system may be initialized by placing an initial card in the card reader and withdrawing the card over the position sensors. The system will then automatically set the counter to the 10 count when the card has been fully withdrawn.

Considering the system in positive logic, in the initialized condition a logical 1 is provided by the counter only at the 10 count position. This enables AND gate 26 such that a logical 1 is provided at the output of AND gate 26 when a coded card is inserted into the card reader and deactivates I initialize sensor 17. Sensor 17 is in the on position and generates a logical 1 signal to NOT gate 41 as light from emitter 19 is detected by sensor 17 until a card is inserted which blocks the light. When the coded card is inserted over sensor 17, sensor 17 is deactivated and provides a logical 0 signal to NOT gate 41. The output of NOT gate 41 is a logical 1 when its input from sensor 17 is a logical 0 and thereby a logical 1 output is provided from AND gate 26 when counter 25 is in the 10 count position. The output of AND gate 26 is coupled to a "reset to zero" input of counter 25 by one-shot multivibrator 40. Thus the logical 1 output signal from AND gate 26 resets counter 25 to the 0 count. The counter then enables AND gate 27. A logical 1 signal is provided by the 0 position sensor when the card has been withdrawn enough for the position sensor to be activated. In the present embodiment, when the card has been withdrawn enough for the light from the corresponding light emitter to turn the photodector utilized as the position 0 sensor on the logical 1 signal is provided to AND gate 27. Thus, when the counter 25 is in the 0 position and the 0 position sensor is activated, AND gate 27 provides a logical 0 output to OR gate 37. OR gate 37 thereby provides a logical 1 signal to one-shot multivibrator 38 and then from multivibrator 38 to one-shot multivibrator 39. As the logical 1 signal generates a pulse from one-shot multivibrator 38 the code in the 0 code-line of card 12, which is being read by code sensors 13, is stored in word 0 of random access memory 42. Word 0 is addressed by the 0 count of counter 25 and the code is written into the memory by a write enable signal provided by the pulse from one-shot multivibrator 38. Then, a delayed logical 1 output pulse is generated by one-shot multivibrator 39 to increment counter 25 to the next sequential count. Since the counter selects only one of AND gates 26–36 to be enabled during any single count, only one sensor (I sensor 17 or position sensors 0–9) is enabled at any one time. Counter 25 is thus automatically incremented by the dynamic movement of the card across position sensors 11 and sensors 11 are sequentially enabled by counter 25. As each enabled sensor is activated the corresponding code-line is read from card 12 and stored in a corresponding word of memory 42 which is controlled by counter 25. As the numbered 9 position sensor is activated code-line 9 is read from a card 12 and stored in word 9 of memory 42 and then counter 25 is incremented to the 10 count position; card 12 is completely withdrawn and the system is ready to accept another coded card.

Memory 42 may then be read and the coded data stored therein utilized for computations; comparisons such as in a security badge reader system for determining a valid coded card; addressing of a computer to provide feedback credit check information about the holder of such card in a credit card validator system and the like. Memory 42 and/or counter 25 may themselves comprise portions of a computer system in which the actual data is utilized which may provide additional flexibility in particular systems.

The data stored in memory 42 in the illustrated embodiment is Hollerith coded and may additionally be translated to binary code, decimal code or any other suitable code by a computer or other logic system. Alternately the card could be coded in binary format or any other convenient coded format.

Figure 3:
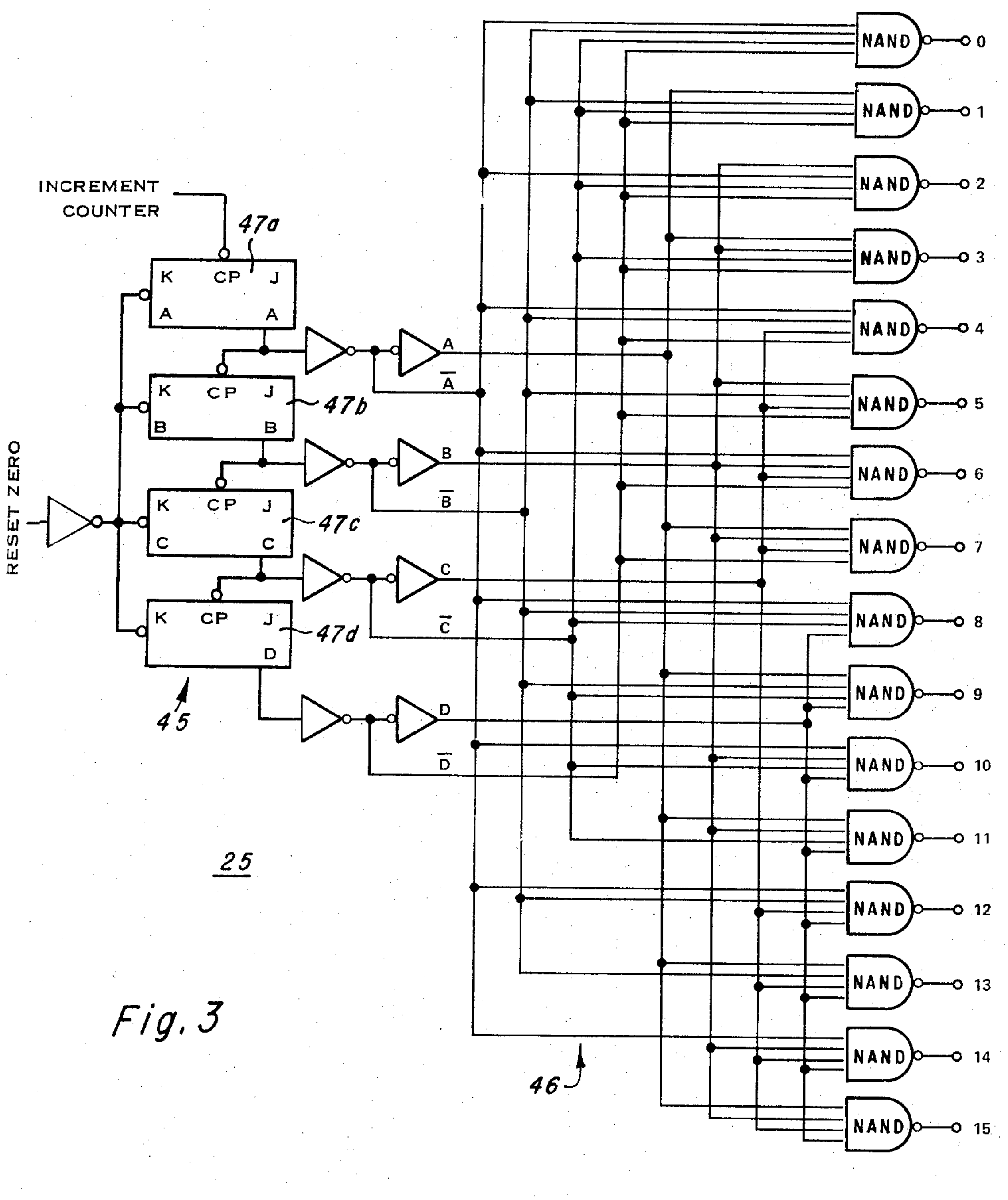
FIG. 3 is a logic diagram of a counter utilized in the embodiment of FIG. 2.

As illustrated in FIG. 3, counter 25 is comprised of a 4-bit binary counter 45 and a 4-bit-to-16-line decoder 46. 4-bit binary counter 45 includes four series coupled JK flip-flops 47*a-d*, a zero reset input and an increment counter input to flip-flop 47*a*. Counter 45 is provided for example, by a standard SN5493 integrated circuit and 4-bit-to-16-line decoder 46 is provided for example, by a standard SN54154 integrated circuit.

Figure 4:
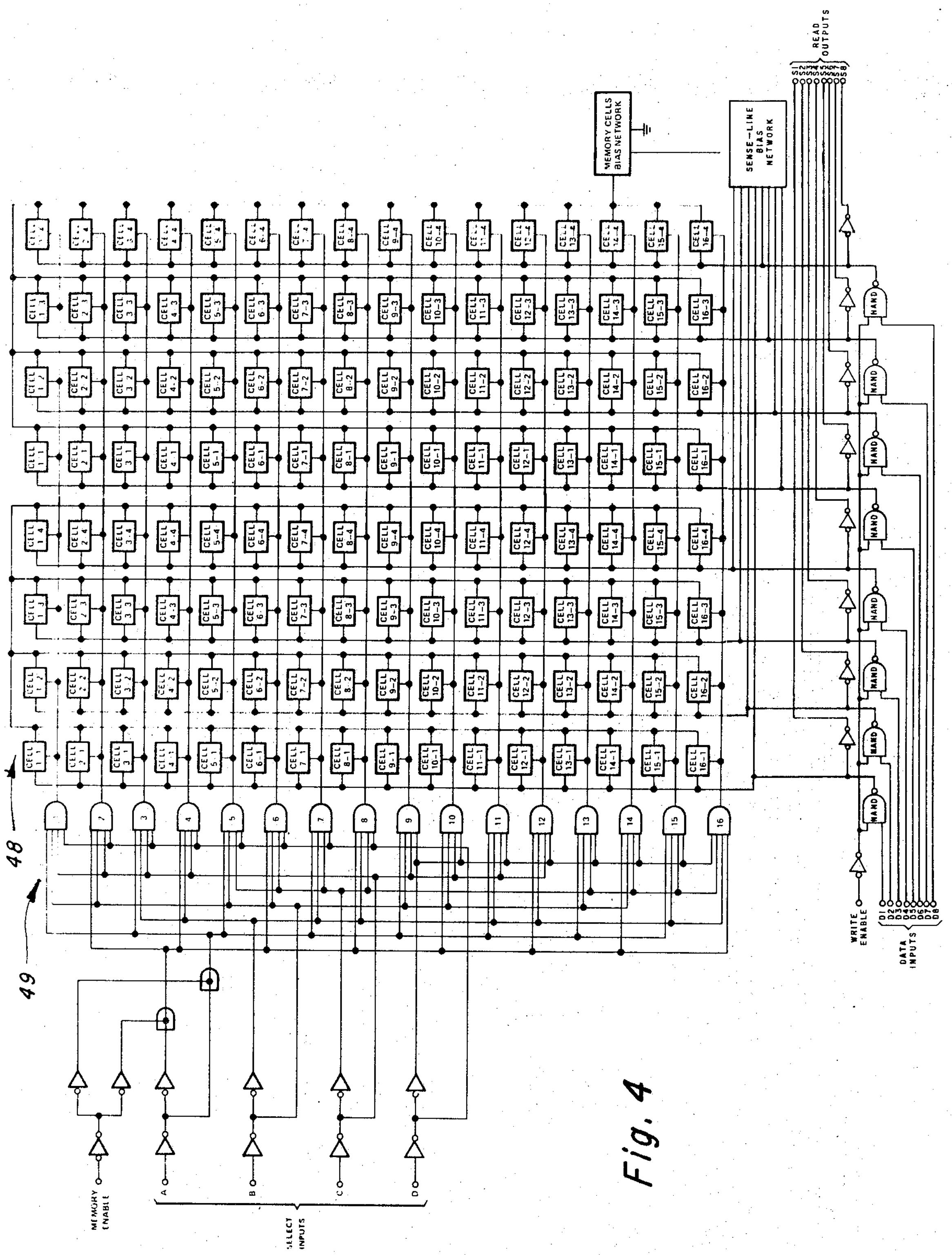
FIG. 4 is a logic diagram of a random access memory utilized in the embodiment of FIG. 2.

An example of a random access memory system which may be utilized in conjunction with the system of FIG. 2 is illustrated in FIG. 4. The memory 42 includes storage for 128 bits in 16 words of 8 bits per word. In the present embodiment, only 6 bits of storage are utilized in 10 of the 16 words. Memory 42 includes its own decoder section 49 although decoder 46 may alternately be utilized to address the memory section 48. Memory 42 is provided, for example, by connecting two standard SN7489 64-bit read/write memory integrated circuits in parallel. The memory 42 includes a memory enable input, address select input to address one of 16 words by counter 45, a write enable input, data inputs which are coupled to sensors 13 and read outputs to read the information stored in memory 42 whereby the information read by code sensors 13 is utilized to perform the computations, comparisons, addressing of other memories, etc.

Figure 5:
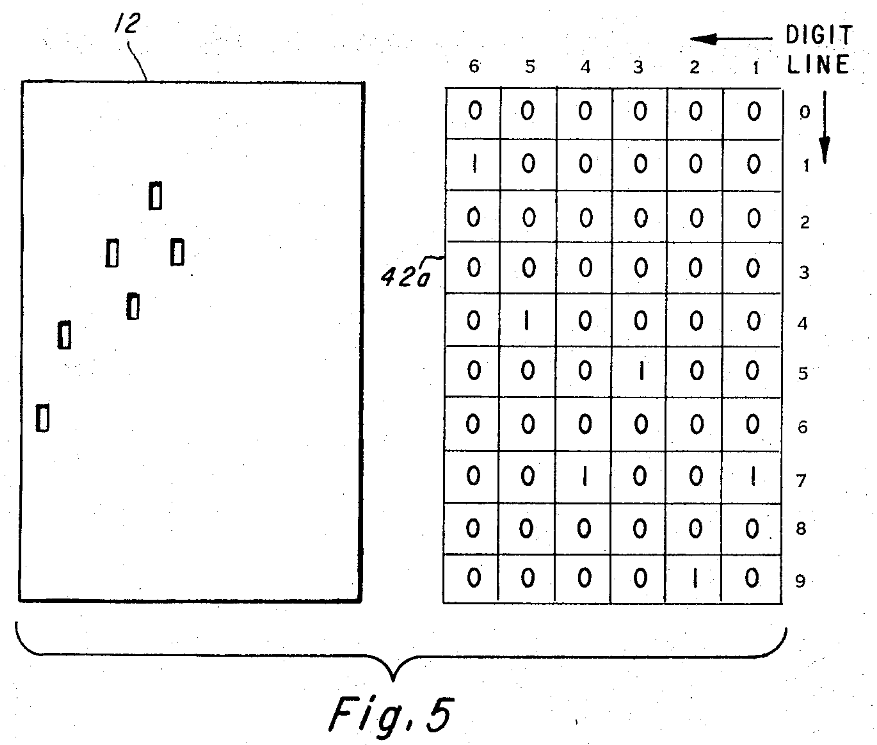
FIG. 5 is a planar view of the coded card of FIG. 1 and the corresponding code stored in the memory as the card is read.

When the card 12 of FIG. 1 has been completely inserted and withdrawn from the card reader, the Hollerith code stored in memory 42 is shown in map 42*a* of FIG. 5. The number recorded on card 12 and stored in memory 42 represents, for example, the numeral 147597.

Figure 6:
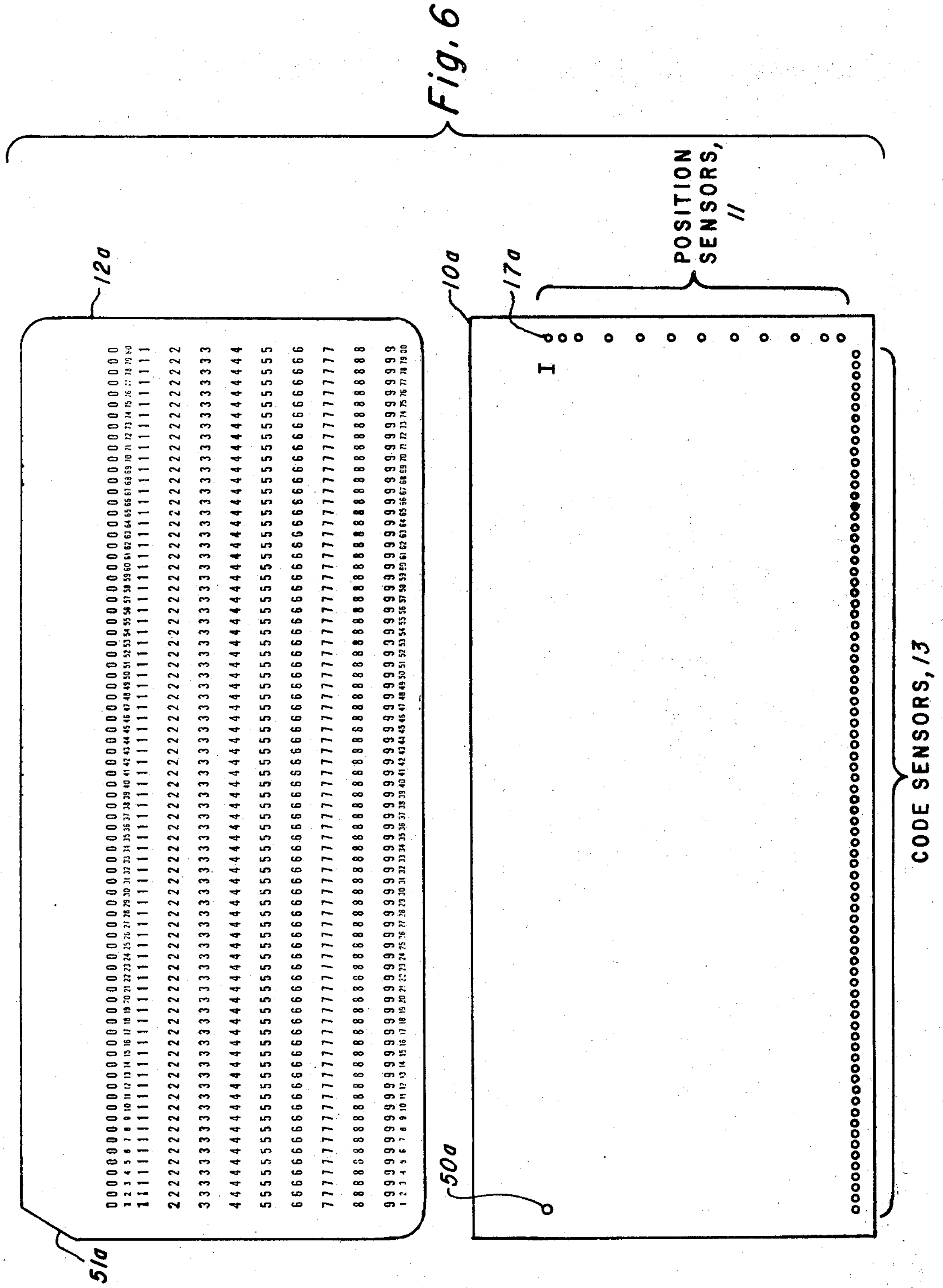

In the embodiment illustrated in FIG. 1, card 12 contained 6 digits of coded information in 6 rows having 10 code-lines. It should be understood, however, that any number of digits and code-lines may be utilized by increasing or decreasing the number of code sensors and position sensors; and, by respectively increasing or decreasing the number of logic gates and the counter and memory capacities. Consider, for example, the standard punched code card 12*a* of FIG. 6 and the corresponding sensor arrangement on substrate 10*a*. There are 12 position sensors and 80 code sensors, an initialize sensor 17*a* and an upside down card sensor 50*a*. If card 12*a* is inserted upside down, such that notch 51*a* does not appear over sensor 50*a*, sensor 50*a* is deactivated and a signal is provided indicative of the card being upside down. It should also be noted that whereas card 12 in FIG. 1 is shown to be inserted and then withdrawn from the card reader, card 12*a* for example, may be inserted and then drawn completely through the card reader for the card to be read. If the card is to be read in that manner, the position sensors are sequenced backwards as compared to the sequencing of the position sensors in FIG. 1. In addition, instead of reading all 80 digits simultaneously, one code-line at a time, card 12*a*, for example, may be read such that all code-lines are read simultaneously one digit line at a time. In order to read the card in this manner the code sensors of FIG. 6 are considered the position sensors which are then sequentially enabled and the position sensors are considered the code sensors which read the coded information from the card.

Figure 7:
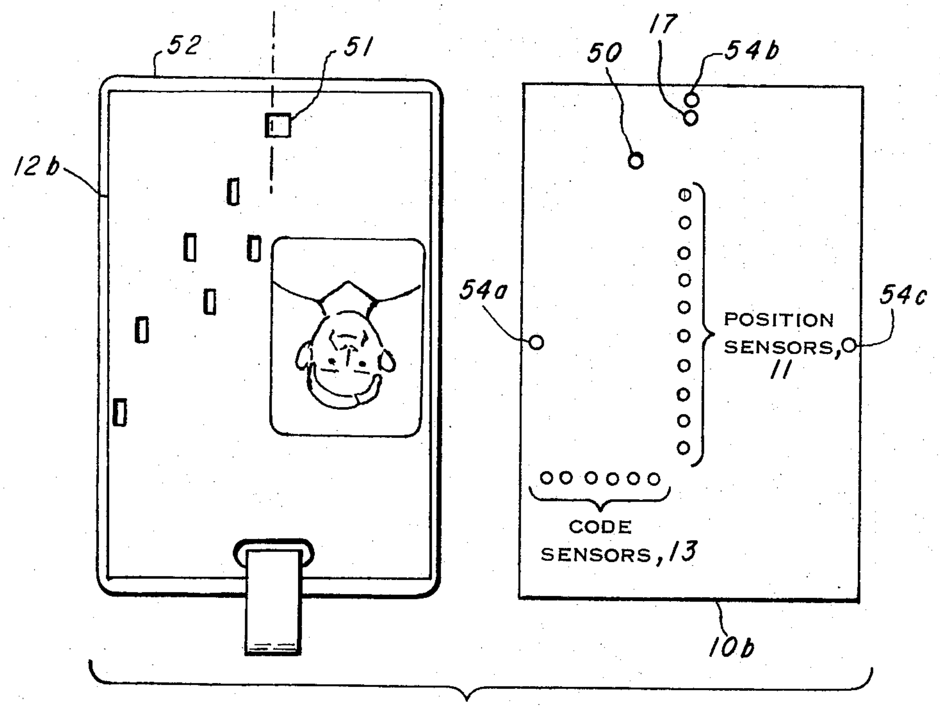
FIGS. 6 and 7 are planar views and FIG. 8 is an isometric view of additional cards and card reader sensor combinations according to various other embodiments of the invention.

Referring to FIG. 7, a security badge which may be worn from a coat lapel or pocket is illustrated. The badge includes a coded card 12*b* similar to the card 12 which may be laminated in plastic material along with a picture of the holder of such security badge. The card and badge 12*b* include an off-centered opening 51 which is sensed by a corresponding sensor 50 positioned on substrate 10*b* for determining when the badge is inserted into the card reader upside down. The badge also includes a clear portion 52 of plastic material surrounding the laminated portion of card 12*b*. Sensors 54*a–c* selectively positioned on substrate 10*b* may be utilized to determine whether the badge is a valid badge or just a punched card such as that illustrated in FIG. 1 by sensing the clear portion 52 at various points around the badge.

Figure 8:
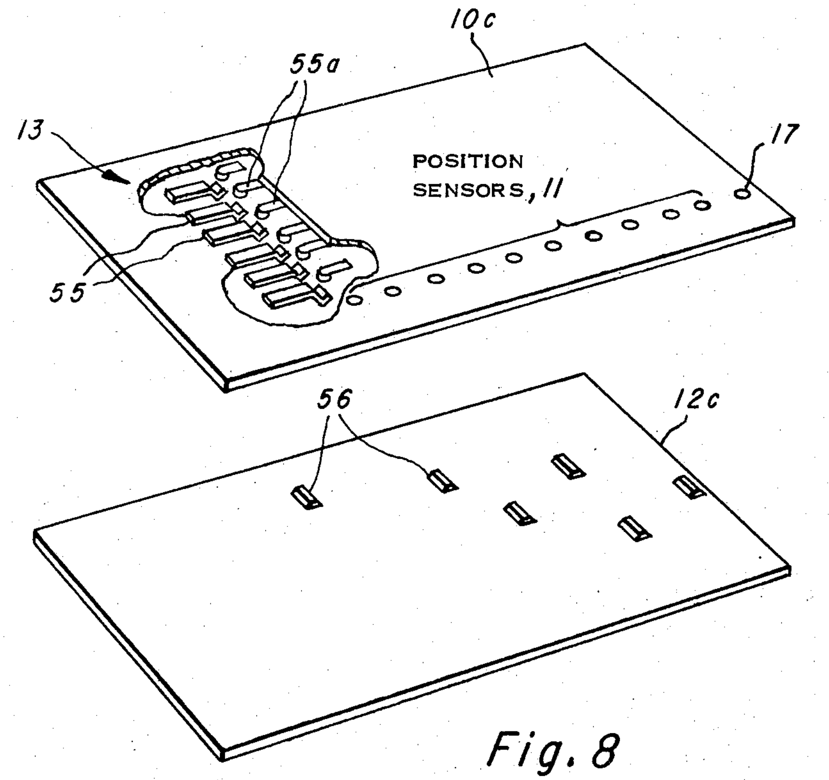

Another type of coded card 12*c* which may be read by the system of the present invention is illustrated in FIG. 8. A credit card 12*c*, for example, may include selectively positioned protruding members 56 corresponding to a code such as a credit card number. In addition to the position sensors 11 which may be photocells or electromechanical switches the sensors 13 for reading information recorded on card 12*c* are shown as electromechanical switches comprised of a plurality of movable contacts 55, for example, which selectively make electrical contact with contacts 55*a* in accordance with the mechanical action provided by the protruding members 56 on card 12*c*. This embodiment of the card reader system is particularly useful in credit card validator systems.

Various embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention, will, without departing from the spirit and scope of the invention, be apparent to persons skilled in the art.

What is claimed is:

1. A system for reading information recorded on card-like members comprising:

a. a plurality of position sensors for sensing the position of such cards as the cards are dynamically moved one at a time across such position sensors;

b. a plurality of code sensors for sensing the information recorded on such cards; and c. a plurality of logic gates for selectively in sequence enabling single ones of said plurality of position sensors exclusive of the others of said position sensors and for generating signals as such cards are moved over each enabled sensor whereby information recorded on such cards corresponding to the enabled position sensor is read by said code sensors.

2. The system according to claim 1 including control means coupled to said plurality of logic gates for sequentially activating said plurality of logic gates, said control means being coupled to and responsive to said generated signals whereby said plurality of position sensors are sequentially enabled in response to said generated signals.

3. The system according to claim 2 wherein said control means includes a counter, said counter being coupled to said logic gates providing said generated signals and being responsive to said generated signals wherein the count provided by said counter selects the position sensor to be enabled and wherein said counter is incremented in accordance with said generated signals.

4. The system according to claim 3 wherein said counter is a binary counter and said control means further includes a binary decoder coupled to said binary counter for selectively enabling said logic gates in accordance with a decoded binary count whereby respective position sensors coupled to the enabled logic gates are enabled.

5. The system according to claim 2 including a memory for storing information recorded on the cards as such information is read by said code sensors.

6. The system according to claim 5 wherein said control means is coupled to said memory such that said memory is addressed in accordance with the state of said control means corresponding to an enabled position sensor whereby information recorded on the cards corresponding to the enabled position is read by said code sensors and is stored in said memory at a corresponding address.

7. The system according to claim 1 including an initialize sensor for sensing the initial presence of cards in the system.

8. The system according to claim 7 including an initialize logic gate coupled to said initialize sensor for enabling said initialize sensor and for generating signals indicative of the presence a card in the system when said initialize sensor is enabled and senses the presence of a card in the system whereby a selected position sensor is enabled.

9. The system according to claim 8 including control means coupled to said initialize logic gate and to said plurality of logic gates for activating said initialize logic gate and for sequentially activating said plurality of logic gates, said control means being coupled to and responsive to the generated signals from said initialize logic gate and the generated signals from said plurality of logic gates whereby a selected one of said plurality of position sensors is enabled in response to the generated signal from said initialize logic gate and whereby the remaining of said plurality of position sensors are sequentially enabled in response to the generated signals provided by said plurality of logic gates.

10. The system according to claim 9 wherein said control means includes a counter, said counter being coupled to an output of said initialize logic gate and to an output of said plurality of logic gates and being responsive to the respective generated signals wherein the count provided by said counter provides the selection of a position sensor to be enabled and wherein said counter is incremented in accordance with said generated signals.

11. The system according to claim 1 including at least one card-upside down sensor for sensing whether a card in the system is upside down and for generating a signal indicative thereof.

12. The system according to claim 11 wherein the cards include a notch, which notch is sensed by the card-upside down sensor.

13. The system according to claim 11 wherein the card-upside down sensor is positioned off-center with respect to the center of the card and wherein the cards include an off-center opening, which opening is sensed by the card-upside down sensor.

14. The system according to claim 1 including at least one invalid-card sensor for sensing the presence of an invalid card in the system and generating a signal indicative thereof.

15. The system according to claim 14 wherein the cards include a transparent edge portion and wherein the invalid-card sensors are positioned in the system such that the detection of such transparent portions are sensed by the invalid-card sensors to determine the validity of such a card.

16. The system according to claim 1 wherein coded information is recorded on the cards in the form of holes selectively positioned on such cards and wherein the code sensors comprise sensors for detecting the presence or non-presence of such holes whereby the coded information is read from such cards.

17. The system according to claim 16 wherein the code sensors include photodetectors in cooperative relationship with photo emitters.

18. The system according to claim 1 wherein coded information is recorded on the cards in the form of selectively positioned protruding members and wherein the code sensors comprise sensors for detecting the presence or non-presence of such protruding members whereby the coded information is read from such cards.

19. The system according to claim 18 wherein the code sensors comprise electro-mechanical switches.

20. The system according to claim 2 wherein said plurality of logic gates are AND gates, an input of each of said AND gates being coupled to a respective one of said position sensors and another input of each of said AND gates being coupled to said control means whereby said control means selectively enables said AND gates and the respective position sensors and whereby when an enabled position sensor is activated by the cards an output of the enabled AND gate provides said generated signals.

21. The system according to claim 20 including an OR gate coupled to the outputs of each of said AND gates wherein generated signals are provided at the output of said OR gate in response to generated signals from the outputs of any of said AND gates, the output of said OR gate being coupled to and providing the generated signals for said control means.

22. A system for reading information recorded on card-like members comprising:

a. a first plurality of sensors positioned in a row on a substrate for sensing the position of such cards as such cards are dynamically moved one at a time across such position sensors;

b. a second plurality of sensors positioned in a row on said substrate substantially perpendicular to the row of position sensors for sensing the information recorded on such cards; and c. a plurality of logic gates respectively coupled to said first plurality of sensors for sequentially enabling single ones of said first plurality of sensors exclusive of the others of said first plurality of sensors and for generating signals as such cards are moved over enabled position sensors whereby information recorded on such cards corresponding to the enabled position sensors is read by said code sensors.

23. The system according to claim 22 including an initialize sensor for sensing the initial presence of a card in the system.

24. The system according to claim 23 including an initialize logic gate coupled to said initialize sensor for enabling said initialize sensor and for generating signals indicative of the presence of a card in the system as said card is sensed by the initialize sensor when such initialize sensor is enabled whereby a selected position sensor is enabled.

25. The system according to claim 22 including at least one card-upside down sensor positioned on the substrate for sensing whether cards in the system are upside down and for generating a signal indicative thereof.

26. The system according to claim 22 including at least one invalid-card sensor positioned on the substrate for sensing the presence of invalid cards in the system and generating a signal indicative thereof.

27. The system according to claim 26 wherein said cards comprise security badges and wherein said at least one invalid-card sensor provides means for detecting the presence of invalid security badges in the system.

28. The system according to claim 22 including control means coupled to said plurality of logic gates for sequentially activating said plurality of logic gates, said control means being coupled to and responsive to said generated signals whereby said plurality of logic gates and said respective first plurality of sensors are sequentially enabled in response to said generated signals.

29. A system for reading information recorded on card-like numbers comprising:

a. a plurality of position sensors for sensing the position of such cards as the cards are dynamically moved one at a time across such position sensors;

b. a plurality of code sensors for sensing the information recorded on such cards;

c. a plurality of AND gates, each having at least two inputs and an output;

d. an OR gate having a plurality of inputs and an output, the inputs of said OR gate being coupled to the outputs of said AND gates whereby a signal is generated from said OR gate when the inputs of any of said AND gates are all activated;

e. means coupling one input of each of said AND gates to a respective position sensor; and f. control means coupled to another input of said AND gates for sequentially activating said AND gates, said means being coupled to the output of said OR gate and responsive to said generated signals whereby single ones of said plurality of position sensors are enabled in sequence and exclusive of the others of said plurality of position sensors.

30. The system according to claim 29 including an initialize sensor for sensing the initial presence of a card, said initialize sensor being coupled to said control means whereby the presence of a card sensed by said initial sensor activates said control means wherein one of said AND gates is activated to enable a first one of said position sensors, the remaining of said position sensors being selectively enabled in response to said generated signals.

31. The system according to claim 29 wherein said control means includes a counter, said counter being coupled to the inputs of said AND gates and being responsive to said generated signals wherein the count provided by said counter selects the position sensor to be enabled and wherein said counter is incremented in accordance with said generated signals.

* * * * *